(12) United States Patent
Keil et al.

(10) Patent No.: US 10,359,137 B1
(45) Date of Patent: Jul. 23, 2019

(54) PIPE SEAL AND PIPE JOINT

(71) Applicant: Northwest Pipe Company, Vancouver, WA (US)

(72) Inventors: Brent Keil, Vancouver, WA (US); Bruce VanderPloeg, Vancouver, WA (US); Guido Quesada, San Jose (CR)

(73) Assignee: Northwest Pipe Company, Vancouver, WA (US)

( * ) Notice: Subject to any disclaimer, the term of this patent is extended or adjusted under 35 U.S.C. 154(b) by 433 days.

(21) Appl. No.: 15/148,948

(22) Filed: May 6, 2016

Related U.S. Application Data

(60) Provisional application No. 62/159,095, filed on May 8, 2015.

(51) Int. Cl.
  *F16L 21/03* (2006.01)
  *F16L 21/04* (2006.01)
  *F16J 15/02* (2006.01)

(52) U.S. Cl.
  CPC ............. *F16L 21/03* (2013.01); *F16J 15/025* (2013.01); *F16L 21/04* (2013.01); *Y10S 285/91* (2013.01)

(58) Field of Classification Search
  CPC . F16L 21/03; F16L 21/04; F16J 15/022; F16J 15/025; F16J 15/102; F16J 15/104; Y10S 285/91
  USPC ........ 285/110, 910, 918; 277/608, 626, 647, 277/650, 654
  See application file for complete search history.

(56) References Cited

U.S. PATENT DOCUMENTS

| | | |
|---|---|---|
| 3,620,556 A * | 11/1971 | Paddington ............ F16J 15/025 285/110 |
| 4,061,459 A | 12/1977 | Parmann |
| 4,120,521 A | 10/1978 | Parmann |
| 4,368,894 A | 1/1983 | Parmann |
| 4,579,354 A | 4/1986 | Vassallo et al. |
| 4,834,398 A | 5/1989 | Guzowski et al. |
| 4,934,716 A | 6/1990 | Nordin et al. |
| 5,326,138 A | 7/1994 | Claes et al. |
| 5,988,695 A | 11/1999 | Corbett, Jr. |
| 6,105,972 A | 8/2000 | Guzowski |
| 6,113,159 A | 9/2000 | Corbett, Jr. |
| 6,152,494 A | 11/2000 | Corbett, Sr. et al. |
| 6,237,966 B1 | 5/2001 | Kearns |
| 6,299,176 B1 | 10/2001 | Guzowski et al. |
| 6,499,744 B1 | 12/2002 | Quesada |
| 6,974,160 B2 | 12/2005 | Jones |
| 7,441,319 B2 * | 10/2008 | Corbett, Jr. ............. F16L 21/03 277/608 X |
| 7,469,905 B2 | 12/2008 | Knapp |
| 7,503,992 B2 | 3/2009 | Knapp |
| 7,731,884 B2 | 6/2010 | Knapp et al. |
| 7,762,559 B2 * | 7/2010 | Suzuki ................... F16J 15/104 277/654 X |
| 2004/0232627 A1 | 11/2004 | Corbett, Jr. |

(Continued)

*Primary Examiner* — Greg Binda
*Assistant Examiner* — Zachary T Dragicevich
(74) *Attorney, Agent, or Firm* — Klarquist Sparkman, LLP

(57) ABSTRACT

A pipe gasket is positioned within a pocket in a socket portion of a first end of a first pipe and the end of a spigot pipe is inserted into the socket with the gasket sealing the gap between the pipes. The gasket in one form comprises a blunt rounded nose portion, a central body portion with an insert embedded therein and a rear sealing portion comprising first and second projections, such as fins, that diverge and respectively engage the first pipe and the second pipe.

17 Claims, 17 Drawing Sheets

(56) References Cited

U.S. PATENT DOCUMENTS

| | | |
|---|---|---|
| 2005/0000644 A1 | 1/2005 | Corbett, Jr. |
| 2006/0082147 A1 | 4/2006 | Corbett, Jr. et al. |
| 2010/0181727 A1* | 7/2010 | Santi |
| 2010/0270753 A1 | 10/2010 | Knapp |

* cited by examiner

DETAIL A
SCALE 2 : 1

DETAIL B
SCALE 2 : 1

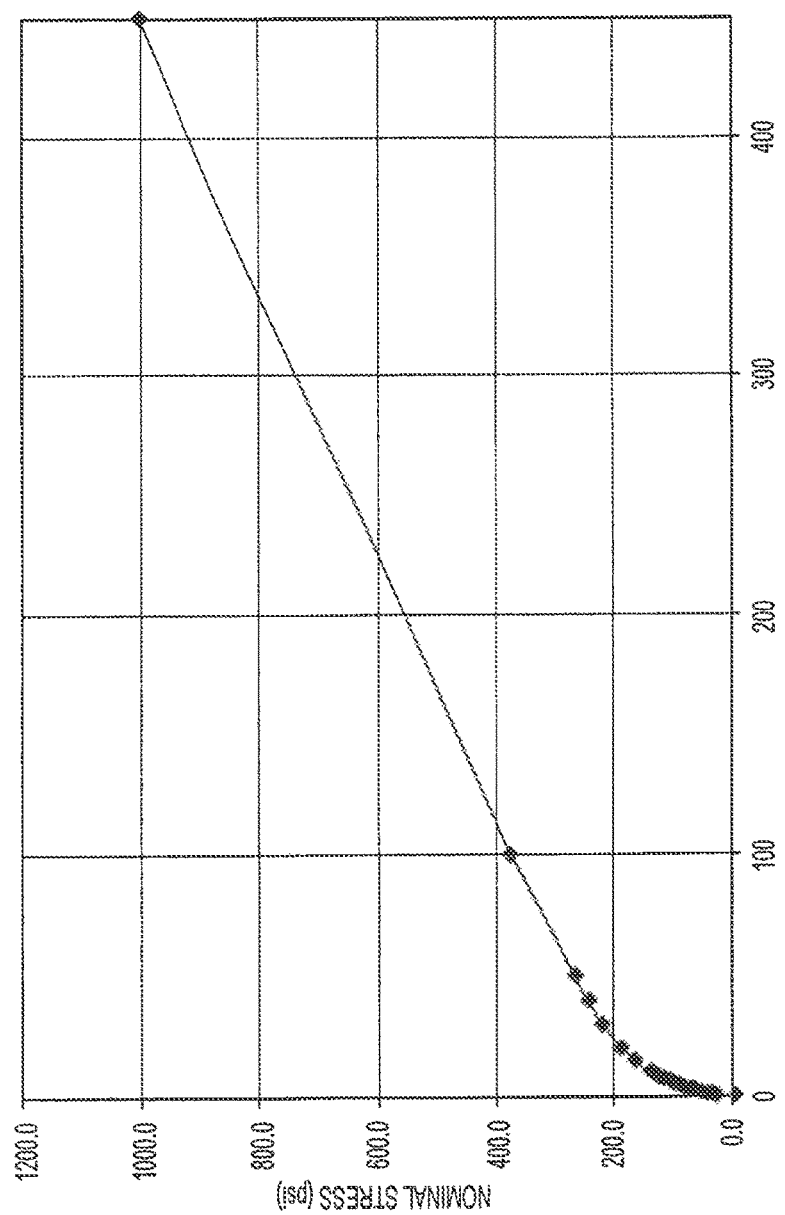

PIPE SEAL AND PIPE JOINT

CROSS REFERENCE TO RELATED APPLICATION

This application claims the benefit of U.S. Provisional Application Ser. No. 62/159,095, entitled PIPE SEAL AND PIPE JOINT, filed on May 8, 2015, which is incorporated by reference herein.

This disclosure relates to pipe gaskets as well as pipe assemblies utilizing such gaskets; including gasketed pipe assemblies involving relatively large pipes such as in excess of twenty inches in diameter.

BACKGROUND

A wide variety of gaskets for use in sealing pipe connections are known.

Despite the existence of such known gaskets, a need nevertheless exists for improved pipe gaskets and pipe systems wherein first and second pipes are assembled and sealed by a pipe gasket. It is particularly desirable to have a pipe gasket capable of sealing pipes, such as relatively large diameter pipes, despite some lack of uniformity in the dimensions of the pipes to be sealed.

SUMMARY

In accordance with an embodiment, a gasket is provided for positioning in an annular pocket bounded by a portion of the inner surface of a socket at one end portion of a first pipe and between the inner surface of the socket and a portion of the outer surface of a second pipe extending through a socket opening at said one end of the first pipe and into the socket, and wherein the first pipe has a first pipe interior. The gasket in this embodiment comprises:

an elongated body comprised of an elastometric material for positioning in the pocket;
  an insert reinforcement comprising a polymeric material positioned within the body and extending along the length of the body;
  the body comprising opposed front and rear end portions, the front end portion facing the socket opening when the body is in the pocket, the body also comprising a central portion between the front and rear end portions, the central portion comprising first and second opposed central surface portions, the first central surface portion being positioned to face the inner surface when the body is in the pocket and the second central surface portion being sized and positioned to engage the outer surface of the second pipe when the body is in the pocket and second pipe is in the socket; and
  wherein the rear end portion comprises first and second fin portions, the first fin portion extending rearwardly from the central body portion and comprising an outer first fin surface positioned to engage the inner surface of the socket when the body is in the pocket, the second fin portion extending rearwardly from the central body portion and comprising a second fin inner surface positioned to engage the outer surface of the second pipe when the second pipe is in the socket, the second fin portion also extending inwardly into the first pipe interior to a greater extent than the second fin inner surface portion at least when the second fin inner surface is not engaging the outer surface of the second pipe.

In accordance with an aspect of an embodiment, the gasket can comprise a V-shaped recess between the first and second fin portions. The angle between the first and second fin portions can be about ninety degrees.

In accordance with another aspect of an embedment, the first and second fin portions can intersect at a central location of the rear end portion of the body, the gasket comprising a compressability enhancing recess extending into the body at the intersection of the first and second fin portions.

In accordance with yet other aspects, the second fin portion can be longer than the first fin portion and the front end portion can be rounded. The front end portion can comprise an arcuate nose portion located nearer to the second central surface portion than to the first central surface portion.

As a further aspect, the first and second central surface portions can be planar and substantially parallel to one another.

As a still further aspect, in transverse cross-section, the reinforcement can be rectangular with rounded corners.

In addition, the reinforcement can include a first reinforcement surface that is substantially parallel to the first central surface portion and a second reinforcement surface that is substantially parallel to the second central surface portion.

As yet another aspect, the gasket is desirably annular with first and second ends that are joined together.

As a still further aspect, the first fin surface can be aligned with the first central surface portion.

As other aspects, the first and second fin portions can each have a proximate end adjacent to and coupled to the central body portion and a distal end spaced from the central body portion. In addition, each of the fin portions can taper in a direction away from their proximate end and toward their distal end. Also, the distal ends of the fin portions can be rounded. Furthermore, the second fin portion can be longer than the first fin portion.

In accordance with an embodiment of a gasket in accordance with this disclosure, the gasket can comprise an elongated body comprising an elastometric material, an insert strip positioned within the body and extending along the length of the body, the body comprising a rounded front body end portion, a central body portion with opposed inner and outer central body surfaces, and a rear body end portion consisting of first and second fins, the first and second fins diverging away from one another when the gasket is in an uncompressed state, wherein at least when the gasket is in an uncompressed state the first fin comprises one surface that is aligned with the outer surface of the central body portion, the second fin having a second fin proximal end portion adjacent to the central body portion and a second fin distal end portion positioned rearwardly and inwardly of the first and second central body surfaces at least when the gasket is uncompressed.

The gasket can comprise a V-shaped recess between the first and second fins; wherein the first and second fins intersect at a central location of the central body portion, the gasket comprising a compressability enhancing recess extending into the body at the intersection location of the first and second fins; wherein the second fin is longer than the first fin; wherein the front body end portion comprises an arcuate nose portion located nearer to the second central surface than to the first central surface; wherein the first and second central surfaces are planar and substantially parallel to one another; and wherein in transverse section the insert strip is rectangular with rounded corners.

In addition, the gasket body and insert can be annular with first and second ends that are joined together.

A gasketed pipe assembly embodiment in accordance with this disclosure can comprise:

a first pipe having a first pipe interior, the first pipe comprising a socket at one end portion of the first pipe with a socket opening at one end of the first pipe adjacent to the socket, the socket having an inner surface and an annular pocket bounded by a portion of the inner surface of the first pipe;

a second pipe having an outer surface facing the inner surface of the first pipe; the second pipe extending through the socket opening and into the socket; and a gasket comprising:

an elongated body comprised of an elastometric material positioned in the pocket;

an insert reinforcement comprising a polymeric material positioned within the body and extending along the length of the body;

the body comprising opposed front and rear end portions, the front end portion facing the socket opening, the body also comprising a central portion between the front and rear end portions, the central portion comprising first and second opposed central surface portions, the first central surface portion being positioned to face the inner surface of the socket, the second central surface portion being sized and positioned to engage the outer surface of the second pipe; and wherein the rear end portion comprises first and second fin portions, the first fin portion extending rearwardly from the central body portion and comprising an outer first fin surface positioned to engage the inner surface of the socket, the second fin portion extending rearwardly from the central body portion and comprising a second fin inner surface positioned to engage the outer surface of the second pipe, the second fin portion also extending inwardly into the first pipe interior to a greater extent than the second central surface portion prior to insertion of the second pipe into the socket.

The gasketed pipe assembly can further comprise a recess between the first and second fin portions, wherein the first and second fin portions intersect at a central location of the rear end portion of the body, the gasket comprising a compressability enhancing recess extending into the body at the intersection of the first and second fin portions, the second fin portion being longer than the first fin portion, wherein the front end portion comprises an arcuate nose portion located nearer to the second central surface portion than to the first central surface portion, wherein the first and second central surface portions are planar and substantially parallel to one another, and wherein the gasket is annular with first and second ends that are joined together.

These and other novel and non-obvious aspects of embodiments will be apparent from the description below.

BRIEF DESCRIPTION OF THE DRAWINGS

FIG. 7 shows the gasket positioned within a pocket of a socket end of a pipe and also an upper outer surface of a first fin portion of the gasket engaging an inner wall of the pocket and a second fin portion projecting rearwardly and inwardly toward the interior of the pipe relative to the central body of the gasket.

FIG. 9A illustrates a graph of nominal stress versus nominal strain for a gasket as determined from modeling.

FIG. 13A illustrates the expected pressure stresses for a maximum seal, maximum spigot configuration, FIG. 13B illustrates the expected pressure stresses for a nominal seal, minimum spigot configuration, FIG. 13C illustrates the expected pressure stresses for a minimum seal, minimum off-center spigot configuration, and FIG. 13D illustrates the expected pressure stresses for a minimum seal, minimum deform spigot configuration. It is to be understood that the various diagrams showing expected pressure stresses in these FIGS. 13A-13D and in the other FIGS. 8A, 9A, 10A-10C, 12A-12B, 14A-14D, and 15A-15D) are simulations of test results.

DETAILED DESCRIPTION

Figure 1:
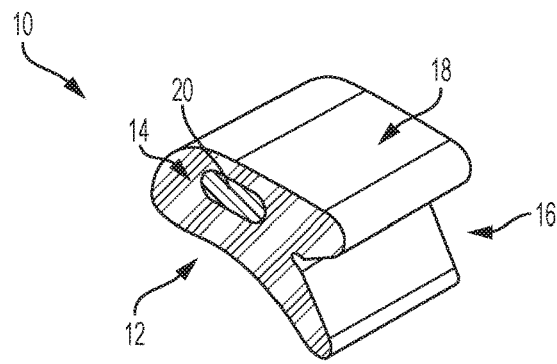
FIG. 1 is a perspective view of a portion of a first embodiment of a pipe gasket in accordance with this disclosure, with a transverse cross section of the exemplary pipe gasket also being illustrated in FIG. 1.

Throughout this disclosure, when a reference is made to a first element being coupled to a second element, the term "coupled" is to be construed to mean both direct connection of the elements as well as indirect connection of the elements by way of one or more additional intervening elements. Also, the singular terms "a", "and", and "first", mean both the singular and the plural unless the term is qualified to expressly indicate that it only refers to a singular element, such as by using the phase "only one". Thus, for example, if two of a particular element are present, there is also "a" or "an" of such element that is present. In addition, the term "and/or" when used in this document is to be construed to include the conjunctive "and", the disjunctive "or", and both "and" and "or". Also, the terms "includes" and "has" have the same meaning as "comprises". Also, the terms "including" and "having" have the same meaning as "comprising". Numerical values set forth in this disclosure and in the drawings are exemplary except to the extent included in any claims that specifically recite such values.

Figure 2:
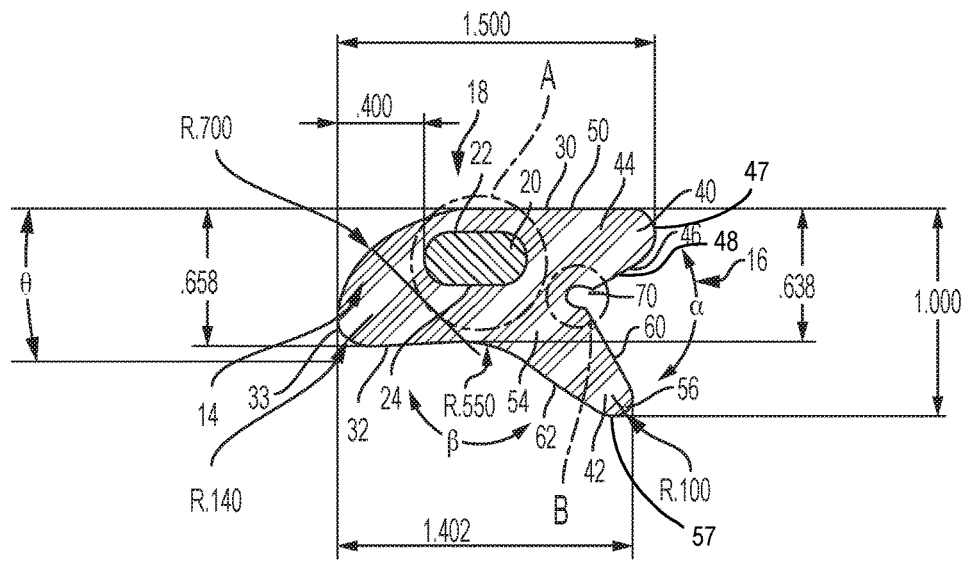
FIG. 2 is a vertical sectional view through a portion of the gasket of FIG. 1.
Figure 3:
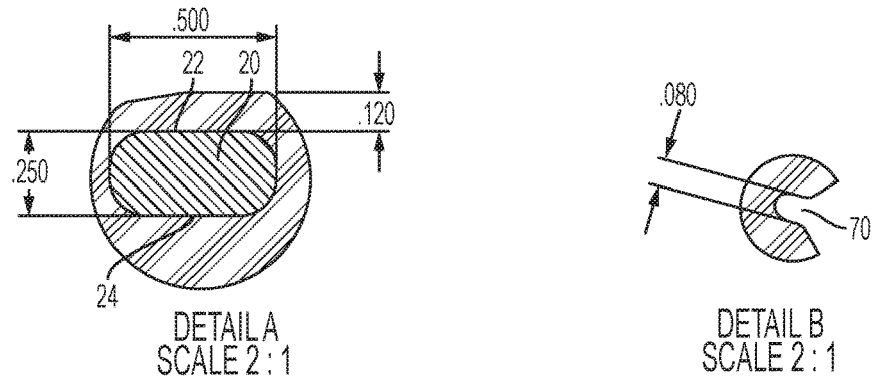
FIG. 3 illustrates a portion of the gasket shown in FIG. 2, comprising an end view of an elongated insert extending lengthwise along the length of the gasket.
Figure 4:
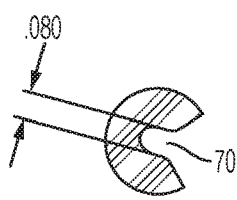
FIG. 4 is an enlarged view of a portion of the gasket of FIG. 2 that illustrates an exemplary compressibility enhancing and stress reducing recess between two fin portions of the gasket.

Referring to FIGS. 1-4, in FIG. 1, an exemplary portion of an elongated gasket 10 is shown. The gasket 10 is desirably annular so as to surround a pipe joint when in use. A vertical sectional view of the gasket is shown in FIG. 2. FIG. 3 illustrates a portion of the gasket of FIG. 1, namely a body portion of the central body of the gasket in which an elongated insert is provided, such as of HDPE, the insert extending lengthwise along the length of the gasket. FIG. 4 illustrates an optional compressibility enhancing recess that also serves to relieve stresses during compression of fin portions of the gasket.

With reference to these figures, gasket 10 comprises a body 12 having a front end portion 14, a rear end portion 16 and a central portion 18 between the front and rear end portions 14, 16.

The body comprises an elastomeric material such as comprising rubber or synthetic rubber. Desirably the gasket (apart from the insert) is of a homogeneous uniform construction. The gasket and insert can be co-extruded with the insert embedded within the gasket.

Desirably, the gaskets comply with American Water Works Association Standards 4.12.6.2-4.12.6.5 (© 2012).

For example, in the case of rubber gaskets, the gasket can comprise not less than 50 percent by volume of first-grade synthetic rubber or synthetic-rubber blends. The remainder of the compound can consist of pulverized fillers free from rubber substitutes, reclaimed rubber, and deleterious substances. The tensile strength can, for example, be at least 2,300 psi; elongation at rupture can be at least 350%; compression set can be a maximum of 20%; the specific gravity can range from 0.95 to 1.45 and be consistent within ±0.05; and Shore A durometer can be 50 to 65.

Embedded within the gasket body 12 is a reinforcement, comprising in one desirable form, an elongated insert strip 20. Desirably the reinforcement is entirely surrounded by the elastomeric gasket material. The insert strip 20 in the form shown is, in transverse section, generally rectangular in cross section with rounded corners. As shown in FIGS. 2 and 3, the insert strip 20 comprises upper and lower reinforcement surfaces 22, 24 that are, in the form shown, desirably substantially parallel to one another. The term "substantially parallel" means within five degrees of being parallel. The insert strip 20 has rounded corners in this example so as to not add stresses to the surrounding gasket material during use of the gasket. Exemplary materials and properties for use as the insert are described below. In one specific form, the insert consists of or comprises a polymeric material such as high density polyethylene (HDPE). As a result, the insert adds strength to the gasket and assists in maintaining the gasket in position as an inner pipe is inserted into the socket of an outer socket pipe; the socket having a pocket within which the gasket is positioned.

For convenience, in this description, the term outer or outward is used with reference to a direction toward the outer or exterior surface of a pipe and inner or inward is used with reference to a direction toward the inner or interior surface of a pipe.

The illustrated gasket of FIG. 1 has a front portion 14 (see also FIG. 2) that is generally rounded in configuration. The central portion of the gasket 18 comprises an outer surface 30 (FIG. 2) and an inner surface 32. The surfaces 30 and 32 can be flat and parallel or substantially parallel to one another. In the example shown in FIG. 2, the outer surface 30 and inner surface 32 converge toward one another by a small angle $\theta$, for example, 2.7 degrees, moving from the front toward the rear of the gasket.

In the example illustrated, the front portion of the gasket 14 is generally arcuate and forms a nose with the front most or forward most portion 33 of the nose being positioned nearer to the inner surface 32 than the outer surface 30. The rounded shape of the front portion of the gasket facilitates insertion of a second inner pipe into a socket or spigot of the outer pipe within which the gasket is positioned.

The rear end portion 16 of the gasket, again with reference to FIGS. 1 and 2, comprises first and second fin portions 40, 42. In the illustrated form, fin portion 40 comprises a proximal fin portion 44 positioned adjacent to, coupled to, and extending from the central body portion 18. Fin portion 40 also comprises a fin distal end portion 46 with a distal end 47. The fin distal end portion 46 in this example is rounded in the embodiment of FIG. 2. Fin portion 40 also has an inner surface 48 and an outer surface 50. The surfaces 48, 50 desirably converge moving from the central body portion toward the distal end portion 46 of the first fin portion. Desirably the outer surface 50 is aligned with the outer surface 30 of the central body portion. Most desirably the surfaces 30 and 50 are substantially planar or planar and the fin portion 40 is sized and positioned such that the outer surface 50 of fin portion 40 abuts the interior surface of an annular pocket of a socket of an outer pipe.

The fin portion 42 comprises a proximate fin portion 54 positioned adjacent to, coupled to, and extending from the central body portion 18. Fin portion 42 also comprises a distal end fin portion 56 with a distal end 57. The distal end fin portion 56 also can be rounded. Fin portion 42 has an outer surface 60 and an inner surface 62. The surfaces 60, 62 of the second fin portion 42 desirably converge moving away from the body portion toward the distal end 57 of the second end portion. The distal end portions 46, 56 are therefore not as thick as the proximal end portions 44, 54 in this embodiment, making the distal end portions more flexible than the proximal end portions.

In the construction shown in FIG. 2, there are only two fins or fin portions. A recess or gap 70 is provided between the respective adjacent surfaces 48, 60 of the fin portions 40, 42. This gap 70 can comprise an angular notch and can be, for example, a V-shaped or U-shaped recess between these fin portion surfaces. The angle of the notch a in this embodiment can be varied with an exemplary angle $\alpha$ being 90 degrees. As can be seen in FIGS. 2 and 4, a compression enhancing recess 70 can be provided in the central body at the base or intersection of the respective fin portions. The recess 70 makes it easier to compress fin portion 42 toward fin portion 40 when a second pipe is inserted into a socket of a first pipe in which the gasket is positioned. When inserted, the outer surface of the second pipe engages the surface 62 of the second fin portion 42. The compressibility enhancing recess also relieves stresses that would otherwise be present at this location as a result of the fin portions being compressed toward one another.

As also can be seen in FIG. 2, an obtuse angle β is desirably provided between surfaces 32 and 62. In the illustrated form, this obtuse angle β can be, for example, 142.5 degrees, although this angle can be varied. In addition, a radius can be provided at a transition between the surfaces 32 and 42. It is desirable that surface 62 of the fin portion 42 be flat to slightly concave to facilitate sealing against the engaged surface of the inner pipe when the inner pipe is inserted. In FIG. 2, the fin portion 42 is longer than the fin portion 40. Also, the fin portion 42 extends rearwardly and downwardly (away from the outer surface 30 of the central body portion) to a location below (inwardly of) the surface 32 at least when the gasket is in an uncompressed state. FIG. 2 illustrates the gasket in an uncompressed state, the state that exists prior to engaging the fin portion 42 with the outer surface of a pipe inserted into the spigot portion of the outer pipe.

Figure 5:
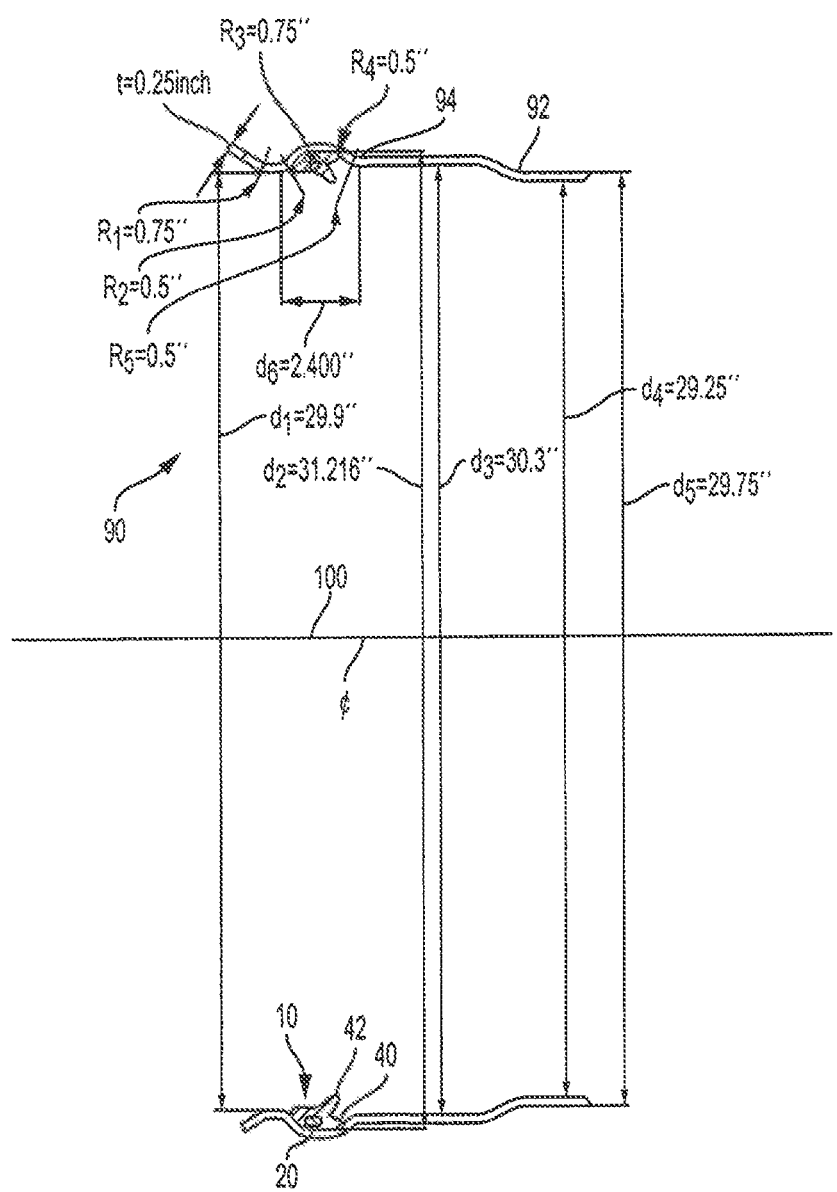
FIG. 5 illustrates an exemplary embodiment of the gasket installed in an annular pocket of a socket portion of a pipe prior to insertion of a second pipe into the socket.

FIG. 5 illustrates an exemplary form of gasket 10 that is like the gasket of FIG. 1 in that it comprises first and second fin portions 40, 42, a central body portion, a front portion with a rounded nose, and an elongated reinforcing insert. FIG. 5 also illustrates an exemplary spigot or socket end 90 of an outer pipe 92 having a pocket 94 within which the gasket is positioned. The gasket 10 in use is annular in form and positioned within the pocket 94 defined by an interior surface of the outer pipe 92. Exemplary dimensions and curvatures of a socket end 90 of a pipe of an approximately thirty inch diameter is shown in FIG. 5. An exemplary socket end 90 is described in greater detail with reference to FIG. 8A. In FIG. 5, the center line of the pipe 92 is indicated at 100.

Figure 6:
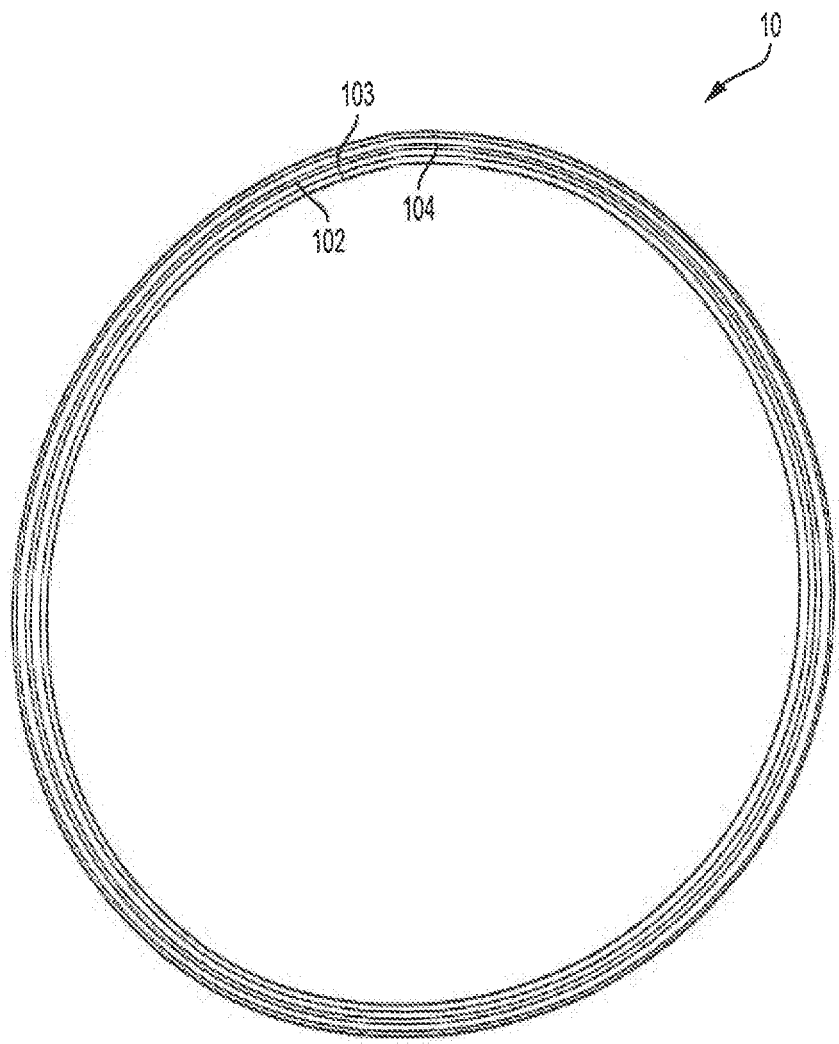
FIG. 6 illustrates an elongated gasket assembled into an annular shape, and more specifically in this example a circular shape, by interconnecting respective ends of the gasket and of an insert, such as by heat fusion, adhesive bonding and/or solvent welding.

FIG. 6 illustrates the gasket in an assembled form. As can be seen in FIG. 6, when assembled, first and second end portions 102, 104 of an elongated gasket are joined together at 103 such as by heat fusion, solvent bonding and/or adhesive bonding. In addition, the inner reinforcement 12 is also desirable joined together at the respective ends 102, 104 of the gasket. The resulting gasket is annular in shape. The gasket is sized to fit within the pocket 94 of the socket 90 of a pipe 92 that is to receive a second pipe to be sealed by the gasket with the first pipe.

Figure 7:
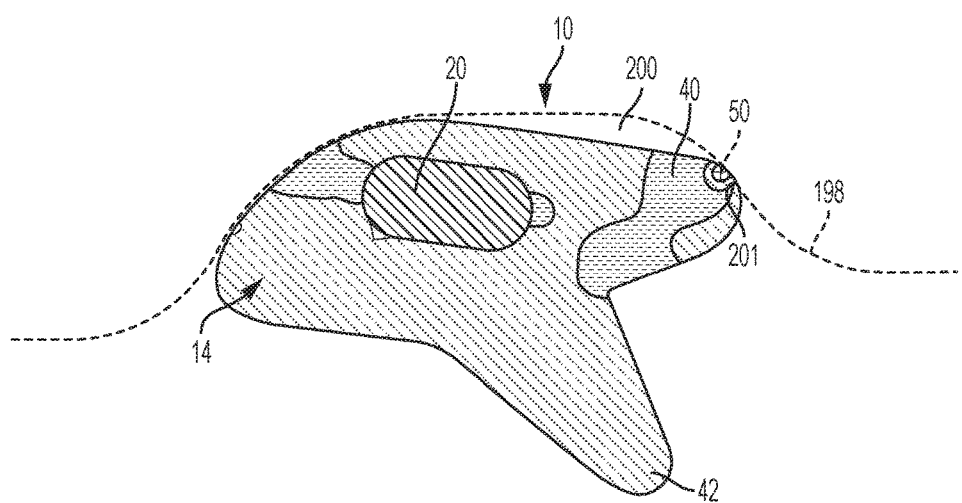
FIG. 7 illustrates a vertical sectional view of a gasket in another form without the compressibility enhancing recess.
Figure 8A:
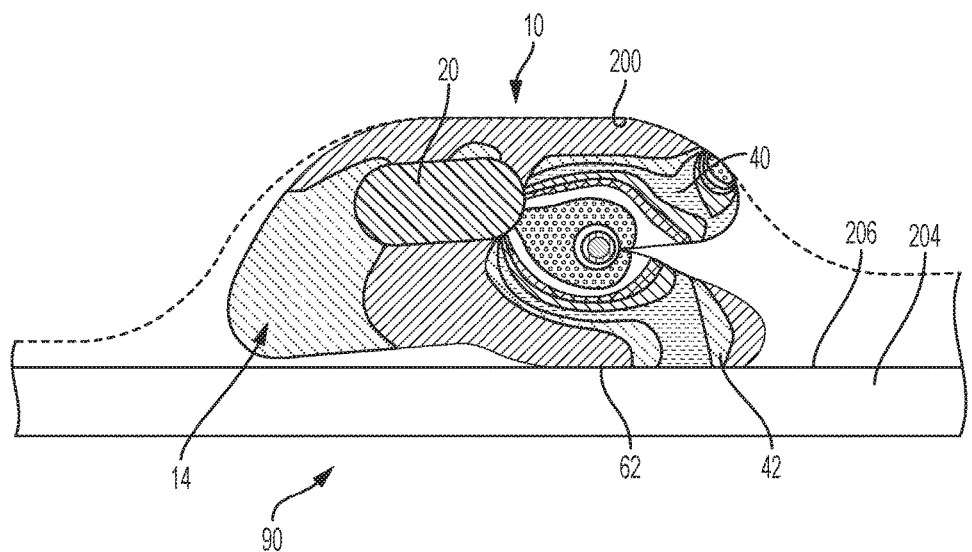
FIG. 8A illustrates the gasket of FIG. 7 compressed by the outer surface of an inserted second pipe; the outer surface of the second pipe bearing against the lower or inner surface of a projecting second fin portion of the gasket of FIG. 7. As can be seen in FIG. 8A, the upper and lower fin portions are compressed toward one another by the second pipe to seal the pipe joint between the pipes when positioned as shown in FIG. 8A.

FIGS. 7, 8 and 8A as well as FIGS. 10A-10C, 12A, 12B, 13A-13D, 14A-14D and 15A-15D illustrate the results of simulations of the gasket performance. The pressure scale for FIGS. 7 and 8A is the scale shown in FIG. 10A. In FIG. 7, an inner surface of an outer pipe is indicated at 198. An annular pocket 200 is shown for receiving the gasket. The outer surface 50 of a portion of the distal end portion of first fin portion 40 is positioned against an inner surface 201 of the rear portion of the pocket 200. Also, in this figure the second fin portion 42 is shown projecting inwardly toward the interior of the pipe 198 because, in FIG. 7, the gasket has not been compressed. The insert 20 is also illustrated within the gasket body in FIG. 7.

In FIG. 8A, a second pipe 204 having an outer surface 206 is shown inserted into the socket end of the first pipe through an end opening of the first pipe that leads to the socket. The second pipe 204 is positioned interiorly of the pocket 200. The outer surface 206 of the second pipe engages a portion of the inner surface 62 of the second fin portion 42 and urges or compresses the second fin portion 42 toward the first fin portion 40. The two fin portions 40, 42 accomplish the sealing between the inner surface of the outer pipe and outer surface of the inner pipe of the assembled pipe joint.

The seal is able to perform well when used in very different pipe dimensional scenarios, including highly packed and difficult to assemble tight scenarios and in deformed pipe and/or loose pipe scenarios.

Figure 8B:
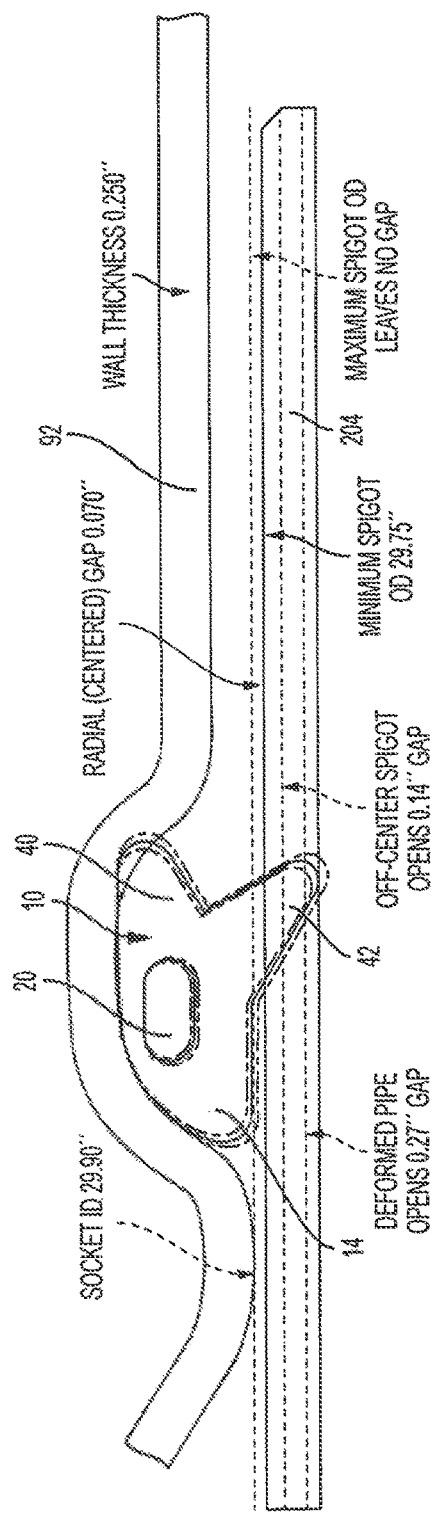
FIG. 8B is similar to the FIG. 7 except that FIG. 8B illustrates the accommodation by the gasket of variations in the outer dimensions of the inserted inner pipe and variations in the inner dimensions of the socket.
Figure 8C:
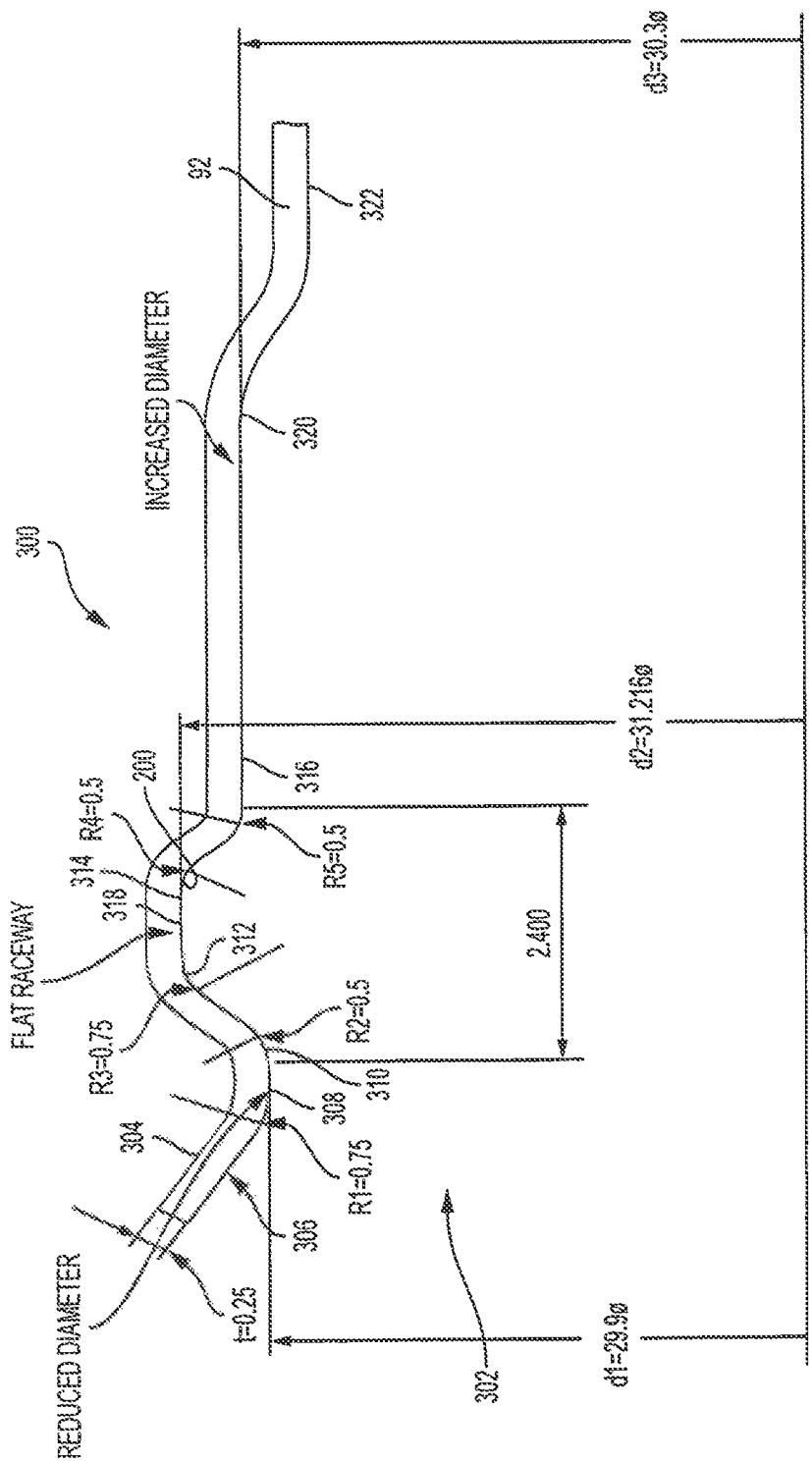
FIG. 8C illustrates an exemplary profile of an exemplary socket end of a pipe.

FIGS. 8B and 8C illustrate an exemplary socket end 300 of an outer pipe 92 in greater detail. An annular pocket 200 is shown in FIG. 8C. The illustrated pipe has a socket end opening 302 leading to the interior of the first outer pipe through which a second inner pipe is inserted with a gasket positioned in the annular pocket 200. The distal or end most portion 304 of the pipe socket end 300 is flared outwardly as indicated in FIG. 8C to provide an enlarged diameter opening for insertion of the second pipe and such that the inner surface 306 of the flared end portion 304 acts as a guide to guide an inner pipe toward the center of the pipe receiving socket of the outer pipe. A first radius R1 is provided at the transition of the flared end portion 304 to a second location 308 of the socket or spigot. The pipe can be of a reduced diameter at location 308, as compared to the diameter d3 at location 316 at the inward end of the pocket to improve seal retention (to resist movement of the seal toward the open end of the pipe) while the increased diameter d3 allows for angular deflection of the inner pipe end as the inner pipe end is inserted into outer pipe 300. The diameter d1 is of a greater diameter than the outer diameter of the pipe to be inserted. This reduction in diameter from the pipe opening toward location 308 assists in positioning the second pipe (the pipe that is to be inserted in the first pipe socket) at a location where the inserted end of the second pipe will more easily pass a gasket positioned within the pocket 200. Inwardly within the socket from location 308 is another radius 310 leading to the pocket 200. The pocket has a radius 312 at its base and nearest to the pipe opening 302 and a second radius 314 at which the pocket transitions toward a narrower dimension location 316. A flat raceway 318 is desirably positioned between transitions 312 and 314 to provide an inner surface against which (or adjacent to) the outer surface of the gasket can be positioned. Typically the first fin portion of the gasket 40 will engage the interior wall of the pocket 200 between transitions 314 and 316 in one exemplary embodiment. From transition 316, the illustrated socket continues at a constant diameter to a transition 320 at which the interior cross sectional dimension of the pipe is reduced to a final dimension indicated at 322.

Radius R4 can be reduced relative to (be smaller than) radius R3 to improve the support of the seal during pipe assembly. Raceway diameter d2 can be increased, such as to 31.22 inches. Radius R3 can be reduced to improve closure of lateral gaps.

With further reference to FIG. 8B, the seal 10 is capable of sealing a socket and spigot assembly despite variations in the dimensions of the socket-spigot combination. FIG. 8B illustrates example variations including an exemplary deformed pipe configuration of the spigot, an exemplary off-center spigot position, an exemplary minimum spigot position and an exemplary maximum spigot position. Despite these variations, the seal still achieves sealing; including good compression against the spigot in an off-center assembly position. In a deformed spigot assembly arrangement, the seal will typically barely touch the spigot, but still accomplishes sealing.

Specific dimensions and radiuses shown in FIG. 8C are exemplary as they can be varied. Additional information concerning the performance of the gasket and simulation results are set forth in connection with other figures found in the disclosure.

Figure 9B:
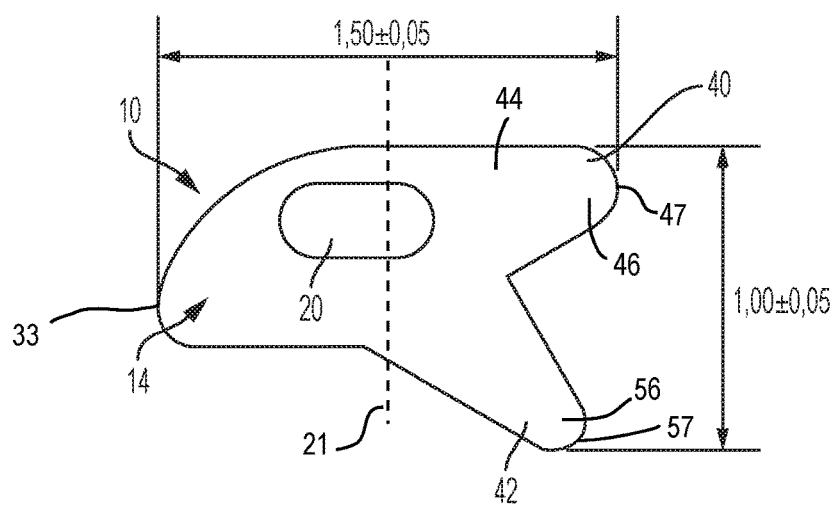
FIG. 9B illustrates an exemplary gasket in cross-section.

FIG. 9A illustrates the results from modeling the performance of a seal of FIG. 9B under various scenarios. In these examples, the pipe is modeled as linear elastic steel and modeled as a rigid surface. Pipe deformation is assumed to be negligible. The insert 20 of the seal is assumed to be an elastic-plastic polypropylene material (HDPE). A specific example is Pro-Fax™ 7823 having an elastic modulus E: 174000 psi; a Poison's modulus: 0.38; and a yield stress: 3920 psi. The seal was modeled using a hyperelastic Marlow Model using uniaxial tension test data. Uniaxial compression test data was disregarded. Stress data at a hundred percent strain and at rupture point were added to the data of FIG. 9A to enhance the model.

FIG. 9B illustrates an example seal 10 without the strain reducing recess 70 shown in the example of FIG. 2. FIG. 9B illustrates a vertical center line 21 through the center of the seal 10 between a front end 33 of the seal and the distal end 47 of the first fin portion 44. Exemplary dimensions are also shown in FIG. 9B. The profile with the V mechanism exhibits tolerance to large dimensional variations. The robust extensions 40, 42 or fins maintain good contact pressure with the pipe segments to be sealed. The bulky nose portion 14 houses the insert 20 away from the sealing mechanism comprising the projecting fins and improves stability.

FIGS. 10A-10C, FIG. 11, FIGS. 12A, 12B, FIGS. 13A-13D, FIGS. 15A-14D and FIGS. 15A-15D illustrate the results of a basic interference analysis of an exemplary seal of FIG. 9B. This analysis is based on joint and seal dimensions only with no pipe deformation taken into account and dimensional tolerance not applied to the socket of the assembly. The materials are assumed to be the same as used for the analysis that resulted in FIG. 9A. In this analysis, a suggested seal height for a specific joint was 1.05 inches with 1.00 inch being an exemplary height to avoid assembly problems in tight scenarios. Seal interference (radial compression) in a centered position desirably is a minimum 22.8%; nominal at 26.7% (lower than a recommended 30%); and a maximum of 37.4%. The minimum and maximum seal compressions are recommended limits, but can be varied. In an off-center position, the seal interference examples include a minimum: 14.9%; nominal: 19.2%; and a maximum: 37.4%; which are values within recommended limits, and again can be varied. The seal volume versus the groove volume ratio is recommended at 75%, but can be varied. A minimum recommendation is 67%; and a maximum is 96% (which results in difficult assembly of the spigot/socket combination) as the maximum seals will barely fit in minimum sized grooves or pockets.

Again, these are exemplary values.

Figure 10A:
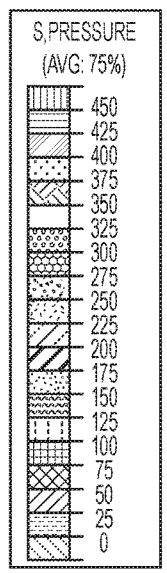
FIGS. 10A-10C illustrate respective nominal, maximum and minimum seal positions of the gasket of FIG. 7, prior to assembly by inserting an inner pipe into the socket.
Figure 10A:
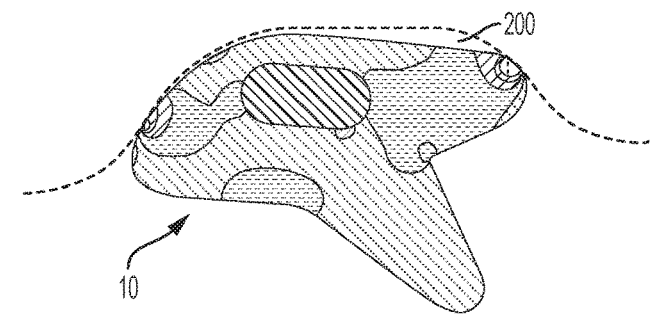
Figure 10B:
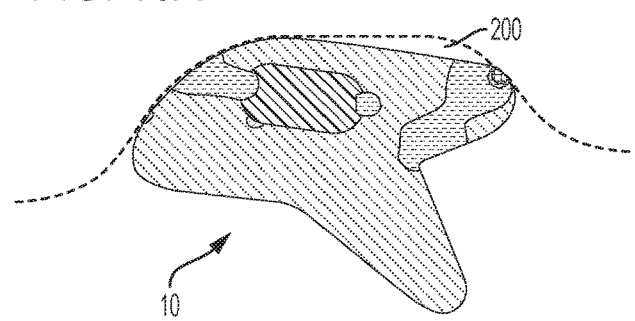
Figure 10B:
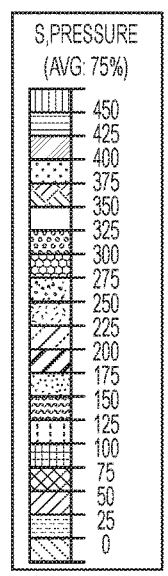
Figure 10C:
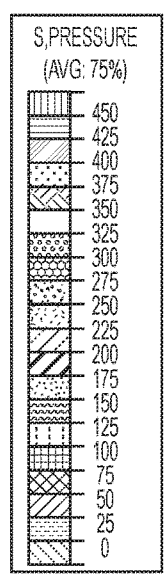
Figure 10C:
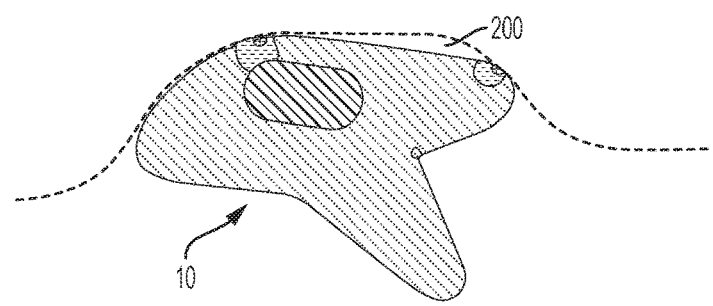

FIGS. 10A, 10B and 10C illustrate the positioning of an exemplary seal in the pocket of a socket pipe prior to assembly. FIG. 10A illustrates a maximum seal position; FIG. 10B illustrates a nominal seal position; and FIG. 10C illustrates a minimum seal position. In these illustrations, seal dimensional scenarios result in similar gasket positions. The dimensional scenarios of the socket are not shown in these figures. The seal can be slightly rotated in the pocket 200 in order to generate a reaction to help close lateral gaps, which improve spigot interference and sealing in loose scenarios. The smallest seal leaves a small gap on the nose side which can be improved by reducing the socket radius R3 (FIG. 8C). The pressure diagrams of FIGS. 10A, 10B and 10C and accompanying scales are based on modeling of the respective maximum seal (FIG. 10A); nominal seal (FIG. 10B); and minimum seal (FIG. 10C) scenarios.

Figure 11:
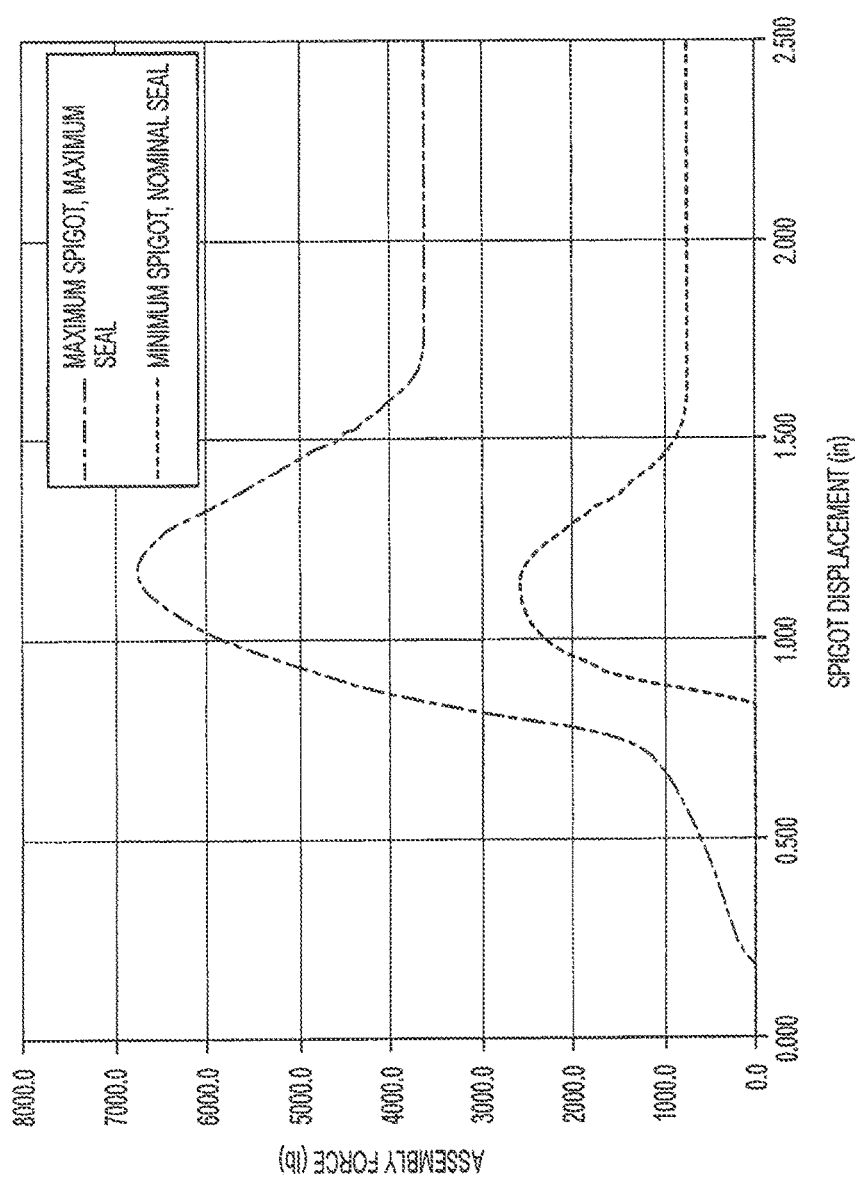
FIG. 11 illustrates exemplary expected assembly forces, determined from simulations, needed to insert a second inner pipe into the socket or spigot depending upon whether a maximum seal or a nominal seal is being accomplished.

FIG. 11 illustrates the results of modeling the assembly forces; with a minimum spigot outside diameter of 29.75 inches being treated as nominal in this example. Assembly force variations are due to dimensional seal variations and can be greater than normal. The assembly force for a maximum spigot outside dimension of 29.90 inches in this example and the maximum seal scenario was high, but assembly can still be completed.

Figure 12A:
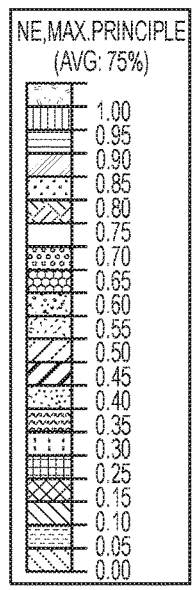
FIGS. 12A and 12B illustrate expected strains at peak assembly for a nominal seal, minimum spigot configuration and for a maximum seal, maximum spigot configuration.
Figure 12A:
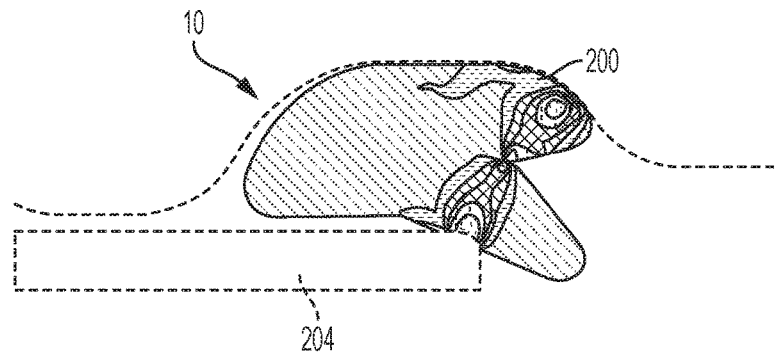
Figure 12B:
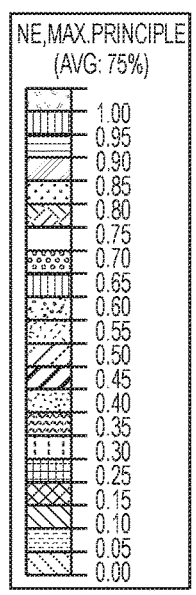
Figure 12B:
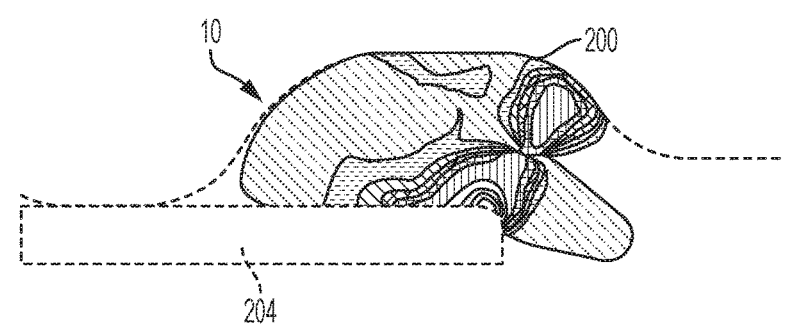

FIGS. 12A and 12B illustrate modeling of strain at peak assembly force in an example. FIG. 12A, a nominal seal and minimal spigot configuration resulted in, at peak assembly force, a maximum seal strain of 0.47 and a peak strain during the entire assembly of 0.52.

In the maximum seal, maximum spigot scenario of FIG. 12B, at peak assembly force the seal strain was 1.54 and the highest strain during assembly was 1.65. These strains were high but within acceptable limits. Adding a champer to the end of the spigot could reduce these strains.

Figure 13A:
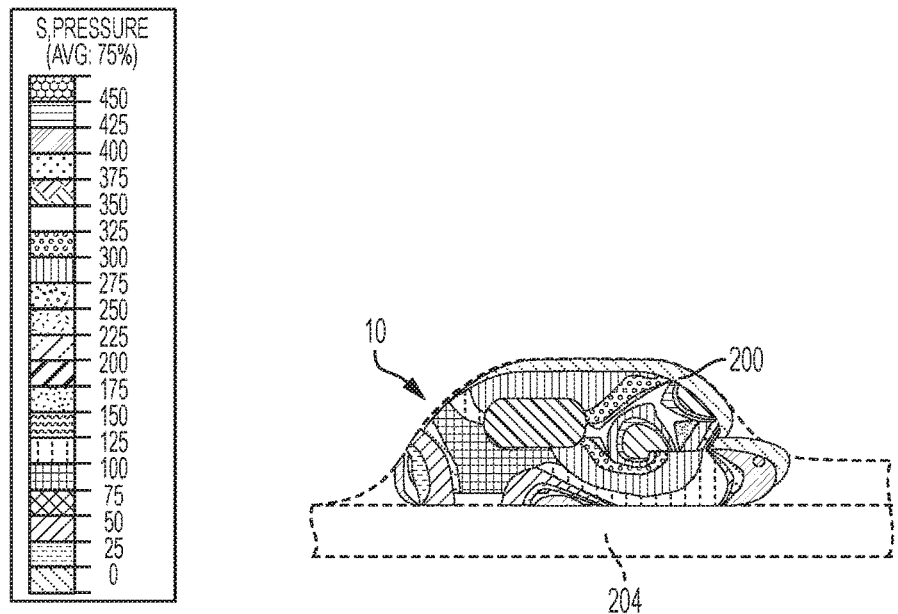
FIGS. 13A-13D illustrate expected seal performance following assembly of the second inner pipe into the first outer pipe socket for various configurations; namely.
Figure 13B:
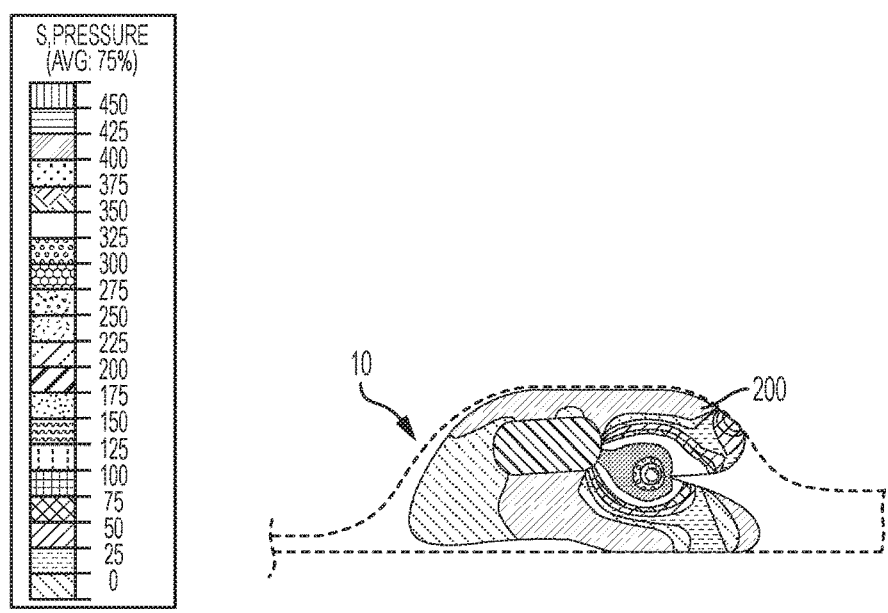
Figure 13C:
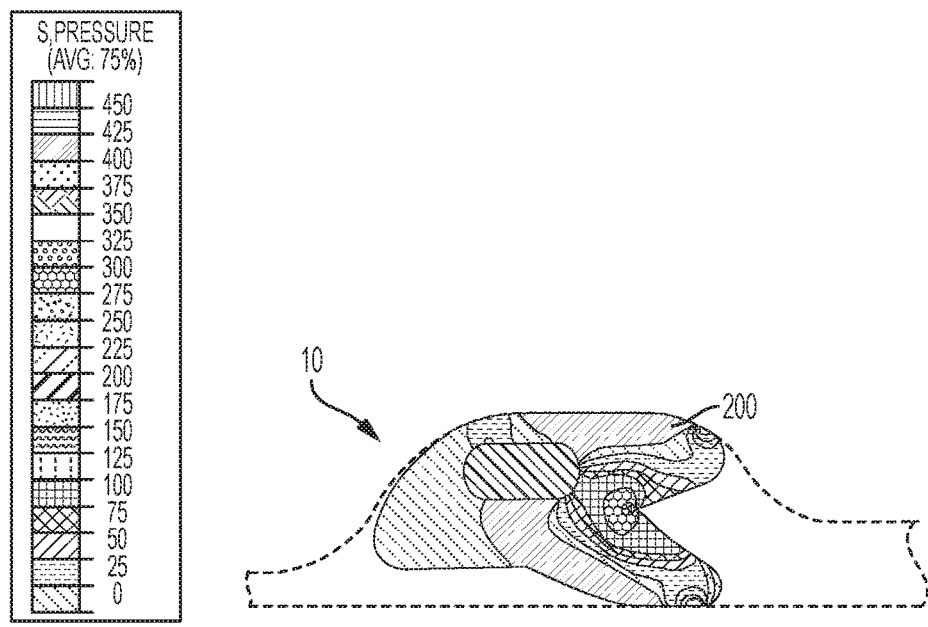
Figure 13D:
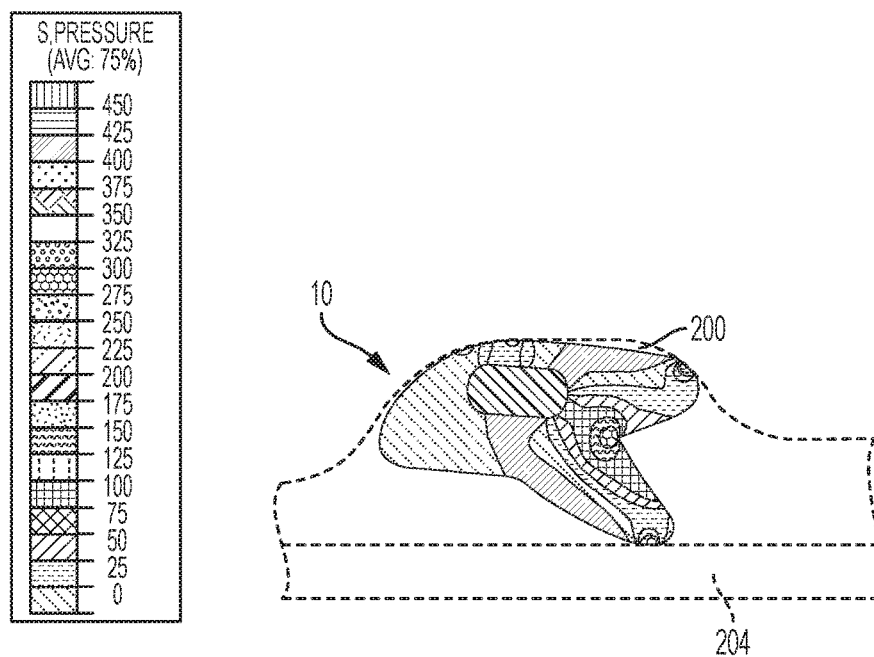

FIGS. 13A through 13D illustrate modeling of seal performance after assembly. FIG. 13A is an exemplary maximum seal, maximum spigot scenario or configuration; FIG. 13B is an exemplary nominal seal, minimum spigot scenario or configuration; FIG. 13C is an exemplary minimum seal, minimum off-center spigot configuration or scenario and FIG. 13D is an exemplary minimum seal, minimum deformed spigot configuration or scenario.

The model pressure stresses shows how seal compression extends from the points of sealing action into the body of the seal. The nominal seal, minimum spigot scenario of FIG. 13B shows the most desirable condition with wide contact regions of the seal and pipes and extensive regions of the seal in compression. The maximum seal, maximum spigot scenario of FIG. 13A shows a fully packed seal with far more compression than necessary. The minimum seal, minimum off-center assembly scenario of FIG. 13C shows effective sealing compression despite empty spaces, with good stress concentration at the tips of the fins of the aft portion of the seal. In the minimum seal, minimum deformed spigot scenario of FIG. 13D, sealing is less than ideal, but the seal is able to provide good pressures.

Figure 14A:
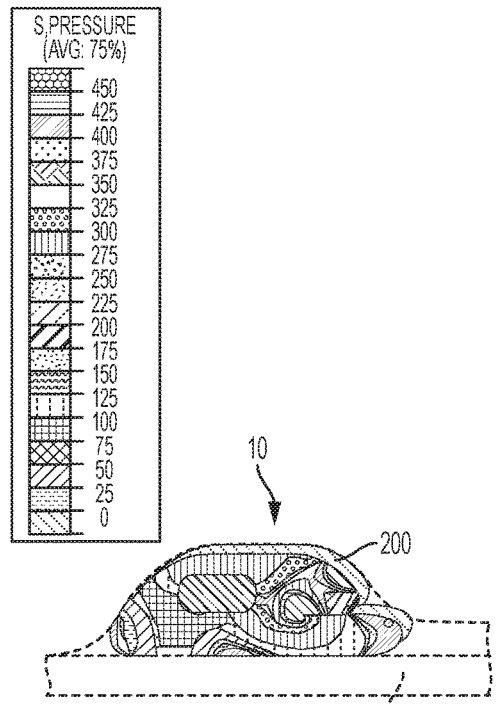
FIGS. 14A-14D illustrate expected seal performance in a vacuum for the configurations described above in FIGS. 13A though 13D.
Figure 14B:
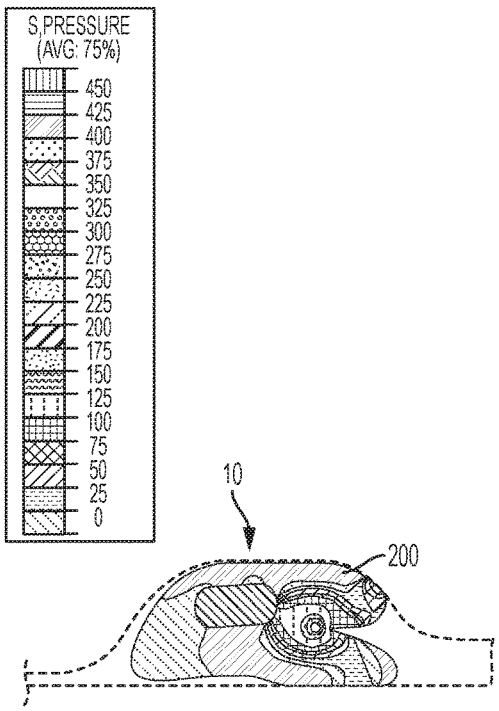
Figures 14C, 14D:
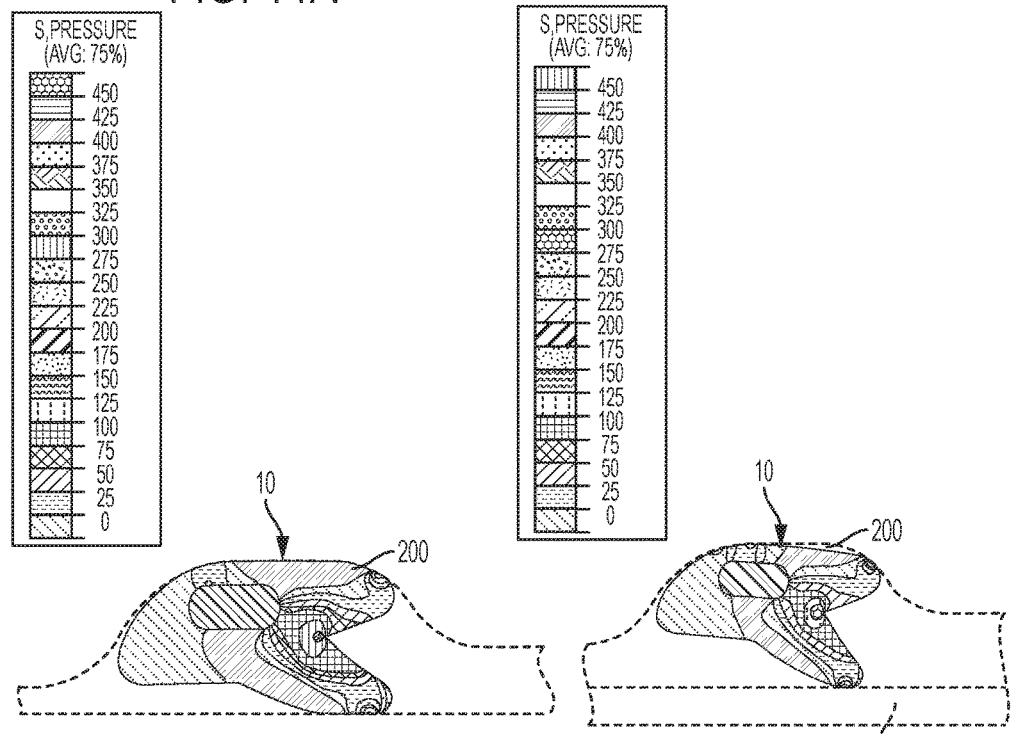
Figure 15A:
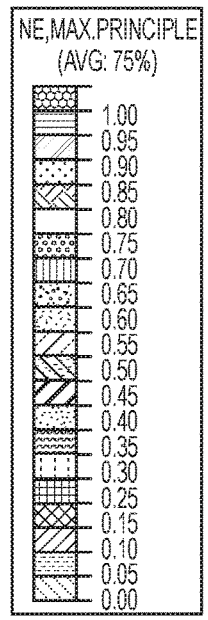
FIGS. 15A-15 D illustrate expected seal strains at a test pressure (450 psi) expected for configurations as described above in connection with FIGS. 13A-13D.
Figure 15A:
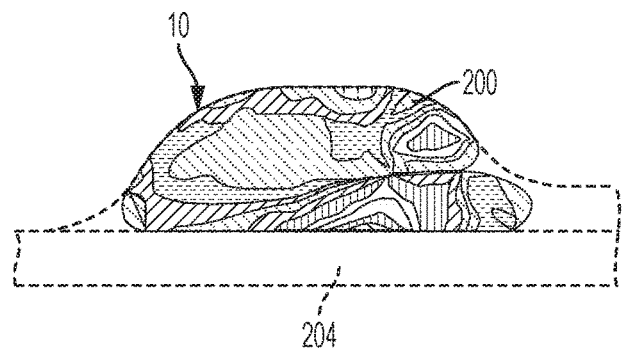
Figure 15B:
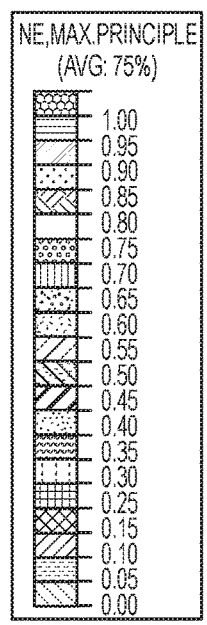
Figure 15B:
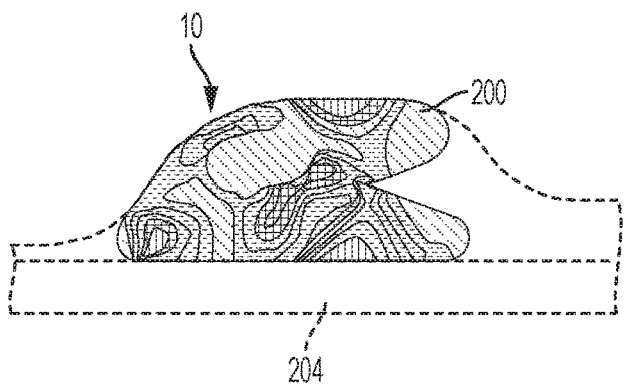
Figure 15C:
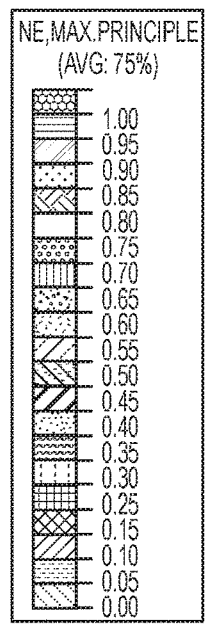
Figure 15C:
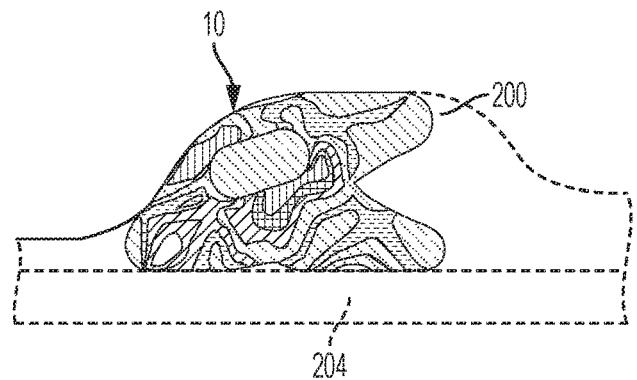
Figure 15D:
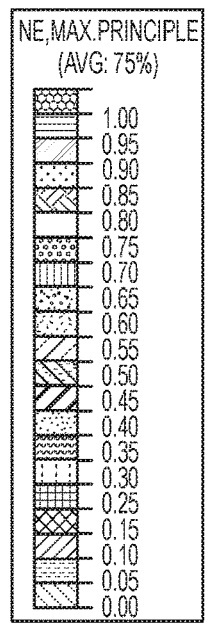
Figure 15D:
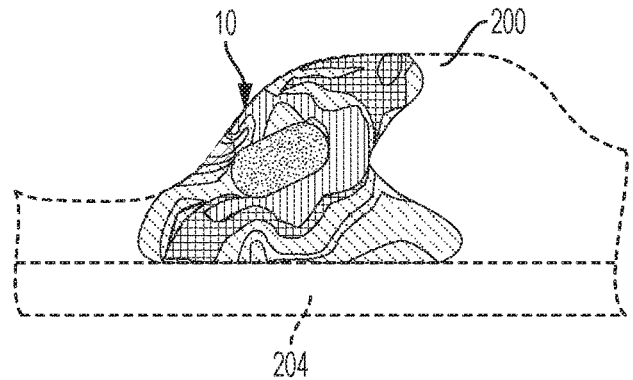

FIGS. 14A, 14B, 14C and 14D illustrate the example of modeling the seal performance in a vacuum. In these figures, FIG. 14A is a maximum seal, maximum spigot configuration or scenario; FIG. 14B is a nominal seal, minimum spigot configuration or scenario; FIG. 14C is a minimum seal, minimum off-center spigot configuration or scenario; and FIG. 14D is a minimum seal, minimum deformed spigot configuration or scenario. The images are shown at a zero psi modeling pressure. The structural effect of the vacuum is negligible. The scenarios show a pressure stress above vacuum pressure. There is a risk of leakage in the minimum seal, minimum deformed spigot scenario of FIG. 14D due to relatively weak seal position FIGS. 15 through 15D illustrate examples from modeling seal strain at test pressure for exemplary scenarios. FIG. 15A is a maximum seal, maximum spigot configuration or scenario; FIG. 15B is a nominal seal, minimum spigot configuration or scenario; FIG. 15C is a minimum seal, minimum off-center spigot configuration or scenario and FIG. 15D is a minimum seal, minimum deformed spigot configuration or scenario. In this modeling, test pressure was set at 450 psi.

The tight and nominal scenarios of FIGS. 15A and 15B illustrate the best behavior of the seal under pressure. In these scenarios, there are small displacements. The nominal seal, minimum spigot scenario of FIG. 15B shows excellent strain distribution. The excessive strain in the tight assembly scenario of FIG. 15A is not expected to produce any damage to the seal. There are only minor stress concentrations in the minimum seal, minimum off-center spigot assembly scenario of FIG. 15C. The excessive strain in the minimum seal, minimum deformed spigot configuration of FIG. 15D could possibly lead to some seal damage away from the sealing region of the fins.

Figure 16:
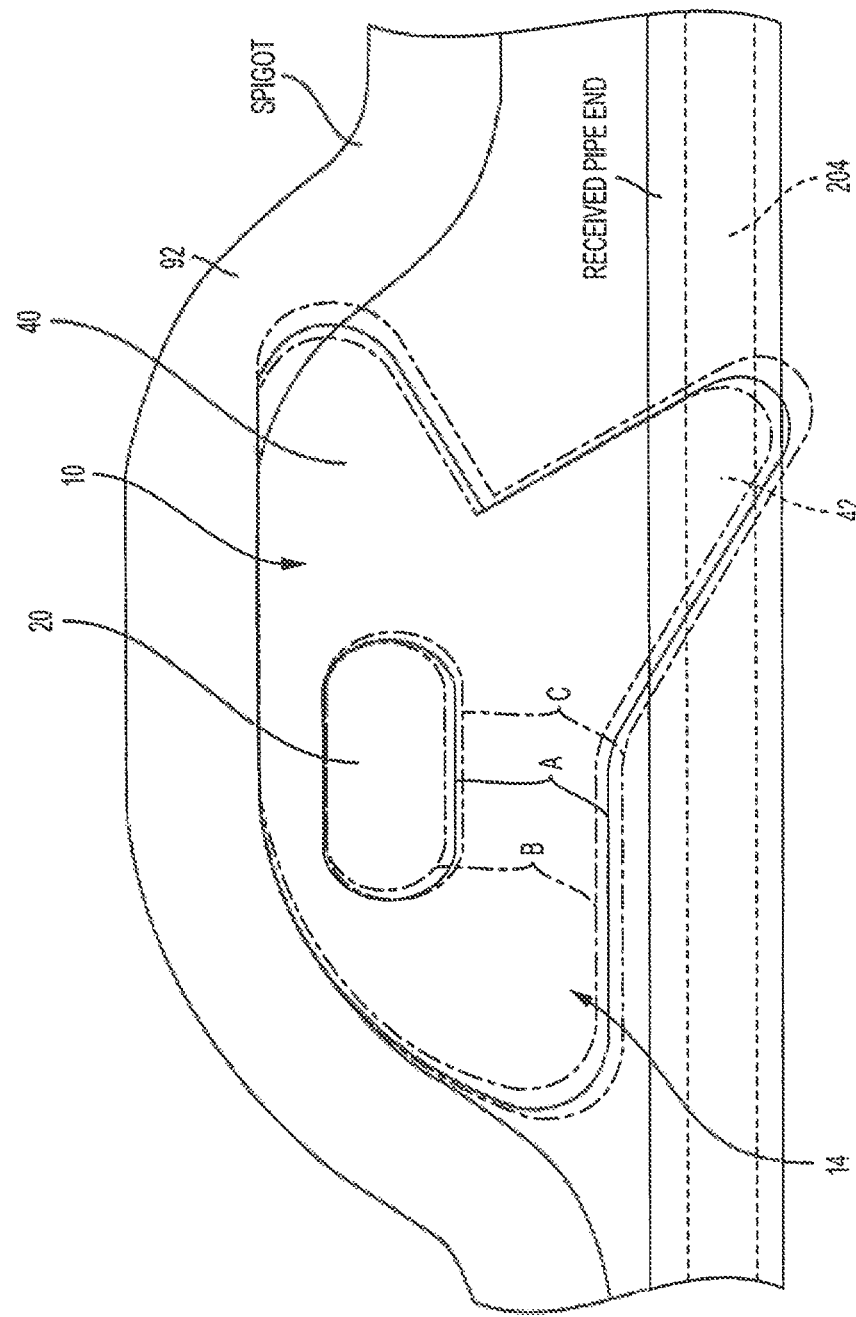
FIG. 16 illustrates a gasket in connection with descriptions of other observations of the performance of the gasket.

With reference to FIG. 16, other observations from the exemplary seal of this figure are as follows. A robust (broad, blunt rounded) seal nose 14 minimizes or prevents seal misplacement and extrusion; the insert 20 is positioned in the seal body away from the sealing mechanism of projections (e.g., fins) 40 and 42; the robust lips of elements 40, 42 on the socket side promote sealing stress concentration between assembled pipe components and provides good support during assembly and closure of lateral gaps; wide assembly ramps at the portion of the seal ahead of the fins 40, 42 assists in seal alignment during assembly; and the robust lip on the spigot side (element 42) enhances sealing at this location in extreme dimensional scenarios; and the fin 40 on the socket side promotes sealing stress concentration, good support during assembly, and closure of lateral gaps between the pipes at this location.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope and spirit of these claims.

We claim:

1. A gasket for positioning in an annular pocket bounded by a portion of the inner surface of a socket at one end portion of a first pipe and between the inner surface of the socket and a portion of the outer surface of a second pipe extending through a socket opening at said one end of the first pipe and into the socket, and wherein the first pipe has a first pipe interior, the gasket comprising:
    a body comprised of an elastomeric material for positioning in the pocket;
    an insert reinforcement comprising a polymeric material positioned within the body and extending along the length of the body;
    the body comprising opposed front and rear end portions, the front end portion having a front end and facing the socket opening when the body is in the pocket, the body also comprising a central portion between the front and rear end portions, the central portion comprising first and second opposed central surface portions, the first central surface portion being positioned to face the inner surface when the body is in the pocket and the second central surface portion being sized and positioned to engage the outer surface of the second pipe when the body is in the pocket and second pipe is in the socket;
    wherein the rear end portion comprises first and second fin portions, the first fin portion extending rearwardly from the central body portion and comprising an outer first fin surface positioned to engage the inner surface of the socket when the body is in the pocket, the second fin portion extending rearwardly from the central body portion and comprising a second fin inner surface positioned to engage the outer surface of the second pipe when the second pipe is in the socket, the second fin portion also extending inwardly into the first pipe interior to a greater extent than the second central surface portion at least when the second fin inner surface is not engaging the outer surface of the second pipe; and
    wherein the gasket has a center between the front end of the body and the distal end of the first fin portion and wherein a portion of the insert reinforcement is positioned rearwardly of the center of the gasket.

2. A gasket according to claim 1 comprising a V-shaped recess between the first and second fin portions.

3. A gasket according to claim 2 wherein the angle between the first and second fin portions is about ninety degrees.

4. A gasket according to claim 1 wherein the first and second fin portions intersect at a central location of the rear end portion of the body, the gasket comprising a recess extending into the body at the intersection of the first and second fin portions.

5. A gasket according to claim 1 wherein the second fin portion is longer than the first fin portion.

6. A gasket according to claim 1 wherein the front end portion is rounded.

7. A gasket according to claim 6 wherein the front end portion comprises an arcuate nose portion located nearer to the second central surface portion than to the first central surface portion.

8. A gasket according to claim 1 wherein the gasket is annular with first and second ends that are joined together.

9. A gasket according to claim 1 wherein the first fin surface is aligned with the first central surface portion.

10. A gasket according to claim 1 wherein the first and second fin portions each have a proximate end adjacent to and coupled to the central body portion and a distal end spaced from the central body portion, each of the fin portions tapering in a direction away from their proximate end and toward their distal end.

11. A gasket according to claim 10 wherein the distal ends of the fin portions are rounded.

12. A gasket according to claim 10 wherein the second fin portion is longer than the first fin portion.

13. A gasket comprising:
    an elongated body comprising an elastomeric material;
    an insert strip positioned within the body and extending along the length of the body;
    the body comprising a rounded front body end portion, a central body portion with opposed inner and outer central body surfaces, and a rear body end portion consisting of first and second fins, the first and second fins diverging away from one another when the gasket is in an uncompressed state;
    the first fin having a distal end, wherein at least when the gasket is in an uncompressed state the first fin comprises one surface that is aligned with the outer surface of the central body portion, the second fin having a second fin proximal end portion adjacent to the central body portion and a second fin distal end portion positioned rearwardly and inwardly of the first and second central body surfaces at least when the gasket is uncompressed; and
    wherein the gasket has a center between the front end portion of the body and the distal end of the first fin and wherein a portion of the insert strip is positioned rearwardly of the center of the gasket.

14. A gasket according to claim 13 wherein the gasket comprises a V-shaped recess between the first and second fins; wherein the first and second fins intersect at a central location of the central body portion, the gasket comprising a recess extending into the body at the intersection location of the first and second fins;
   wherein the second fin is longer than the first fin;
   wherein the front body end portion comprises an arcuate nose portion located nearer to the second central surface than to the first central surface;
   wherein the first and second central surfaces are planar and substantially parallel to one another; and
   wherein in transverse section the insert strip is rectangular with rounded corners.

15. A gasket according to claim 14 wherein the body and insert are annular with first and second ends that are joined together.

16. A gasketed pipe assembly comprising:
   a first pipe having a first pipe interior, the first pipe comprising a socket at one end portion of the first pipe with a socket opening at one end of the first pipe adjacent to the socket, the socket having an inner surface and an annular pocket bounded by a portion of the inner surface of the first pipe;
   a second pipe having an outer surface facing the inner surface of the first pipe; the second pipe extending through the socket opening and into the socket; and
   a gasket comprising:
   a body comprised of an elastomeric material positioned in the pocket;
   an insert reinforcement comprising a polymeric material positioned within the body and extending along the length of the body;
   the body comprising opposed front and rear end portions, the front end portion facing the socket opening, the body also comprising a central portion between the front and rear end portions, the central portion comprising first and second opposed central surface portions, the first central surface portion being positioned to face the inner surface of the socket, the second central surface portion being sized and positioned to engage the outer surface of the second pipe;
   wherein the rear end portion comprises first and second fin portions, the first fin portion extending rearwardly from the central body portion and comprising an outer first fin surface positioned to engage the inner surface of the socket, the second fin portion extending rearwardly from the central body portion and comprising a second fin inner surface positioned to engage the outer surface of the second pipe, the second fin portion also extending inwardly into the first pipe interior to a greater extent than the second central surface portion prior to insertion of the second pipe into the socket; and
   wherein the gasket has a center between the front and rear end portions, and wherein a portion of the insert reinforcement is positioned rearwardly of the center of the gasket.

17. A gasketed pipe assembly according to claim 16 comprising a recess between the first and second fin portions, wherein the first and second fin portions intersect at a central location of the rear end portion of the body, the gasket comprising a recess extending into the body at the intersection of the first and second fin portions, the second fin portion being longer than the first fin portion, and wherein the front end portion comprises an arcuate nose portion located nearer to the second central surface portion than to the first central surface portion, wherein the first and second central surface portions are planar and substantially parallel to one another, and wherein the gasket is annular with first and second ends that are joined together.

* * * * *